United States Patent [19]

Perkins

[11] 3,957,131
[45] May 18, 1976

[54] SAFETY IGNITION SWITCH AND BRAKE ACTUATOR

[76] Inventor: Dwight L. Perkins, Rte. 1, Haines, Oreg. 97833

[22] Filed: Nov. 19, 1973

[21] Appl. No.: 416,907

Related U.S. Application Data

[63] Continuation-in-part of Ser. No. 297,351, Oct. 13, 1972, abandoned.

[52] U.S. Cl. .......................... 180/99; 123/198 DC; 180/103 BF; 200/61.87
[51] Int. Cl.² ........................................ B60K 28/00
[58] Field of Search.......... 180/103, 99, 82 R, 82 C; 192/3 R; 188/24; 200/161, 157, 61.85, 61.87, 155 R; 123/198 DC

[56] References Cited
UNITED STATES PATENTS

| | | | |
|---|---|---|---|
| 747,370 | 12/1903 | Brislin | 180/99 |
| 2,870,874 | 1/1959 | Politte | 193/3 R |
| 3,037,576 | 6/1962 | Bianco | 180/99 |
| 3,694,596 | 10/1971 | Carlson | 200/61.87 |
| 3,695,379 | 10/1972 | Veilleux | 180/103 |
| 3,734,230 | 5/1973 | Tanka | 123/198 DC |
| 3,758,736 | 9/1973 | Tanaka | 180/103 |
| 3,759,352 | 9/1973 | Toplis | 188/24 |
| 3,789,938 | 2/1974 | Hetteen | 180/103 |
| 3,821,504 | 6/1974 | Shoemaker et al. | 200/161 |
| 3,845,847 | 11/1974 | Camp | 200/61.87 |

*Primary Examiner*—Leo Friaglia
*Assistant Examiner*—John A. Pekar
*Attorney, Agent, or Firm*—John W. Kraft; Charles L. Kraft, II

[57] ABSTRACT

The safety ignition switch and brake actuator for motorized, handle-bar operated, apparatus comprises a housing fastened to a handle bar and a brake handle lever pivotally mounted to the housing about the grip operable to be disengaged when the lever is depressed adjacently about the handle bar grip and engaging the brake when the lever is released and pivoted away from the grip.

5 Claims, 6 Drawing Figures

SAFETY IGNITION SWITCH AND BRAKE ACTUATOR

REFERENCE TO OTHER APPLICATIONS

This is a continuation-in-part application of my application Ser. No. 297,351, filed Oct. 13, 1972, now abandoned.

FIELD OF THE INVENTION

The present invention relates to control for motorized, handle-bar operated apparatus and the like, and more particularly to a safety ignition switch and brake actuator to apply brakes and shut down the engine when the handle-bar is released.

DESCRIPTION OF THE PRIOR ART

It is a principal problem with a number of motorized apparatus, particularly recreational vehicles such as motorized snow sleds, gas powered tools and the like, that in an emergency situation the brake is not automatically applied, or must be applied by temporary manual pressure. The engine is almost invariably permitted to continue an operation. With motorized snow sleds, the problem is further compounded by the typical handle bar throttle control, and the straddle, perch-like saddle on which the rider may be more captive than in control. Thus, the rider may be thrown or not in control and the vehicle may continue to move for lack of application of the brakes and the motor continuing to run. This is especially so if the throttle cable is damaged or becomes stuck, and the engine remains in a high operating speed through the emergency. The potential for injury and damage is obvious.

Accordingly, it is an object of the present invention to provide a brake actuating and engine shut-down means which may both apply the brake and stop the engine if the handle is released.

It is a further object that the brake and shut-down assembly include various alternative means for providing mechanical movement to apply the brakes by a linkage which either pushes or pulls the conventional brake system of the various types of vehicles.

It is another object of this invention to provide means for retaining the brake and shut-down means of the combination handle in a position which retains the brake out of engagement and which maintains operation of the engine.

It is a further object of this invention that the brake and shut-down assembly be provided with an override switch which may permit the brake to be applied without the cut-off switch being operable to shut off the engine, and that said override be applied only by a conscious decision act of the operator.

These and other objects shall become apparent from the description following, it being understood that modifications may be made without affecting the teachings of the invention here set out.

SUMMARY OF THE INVENTION

The safety ignition switch and brake actuator for motorized, handle-bar operated, apparatus comprises a housing fastened to a handle bar and a brake handle lever pivotally mounted to the housing about the grip operable to be disengaged when the lever is depressed adjacently about the handle bar grip and engaging the brake when the lever is released and pivoted away from the grip. The lever is provided with means for actuating a cut-off switch which may break the electrical circuit controlling ignition in the engine. The brake and shut-down assembly may further include an idling trigger which may retain the brake lever adjacent the grip to disengage the brake and maintain the engine circuit. Alternating embodiments of the brake and shut-down assembly includes means which result in a "push" or which result in a "pull" of the brake control cable. A further embodiment of the brake and shut-down handling includes an idling trigger to retain the brake cover adjacent the grip to maintain operation of the engine and hold the brakes disengaged. A still further embodiment of the brake and shut-down assembly includes an override switch which may permit the brake lever to be released to engage the vehicle brakes while overriding the ignition cut-off switch to maintain the engine at idling speed.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
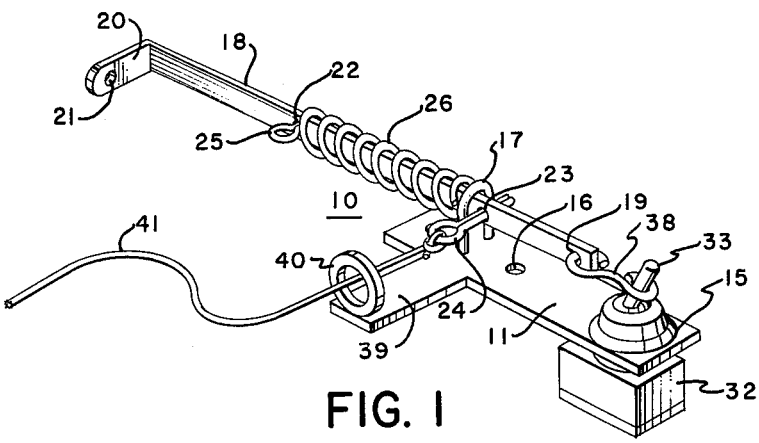
FIG. 1 is a perspective view of the safety control of this invention.
Figure 2:
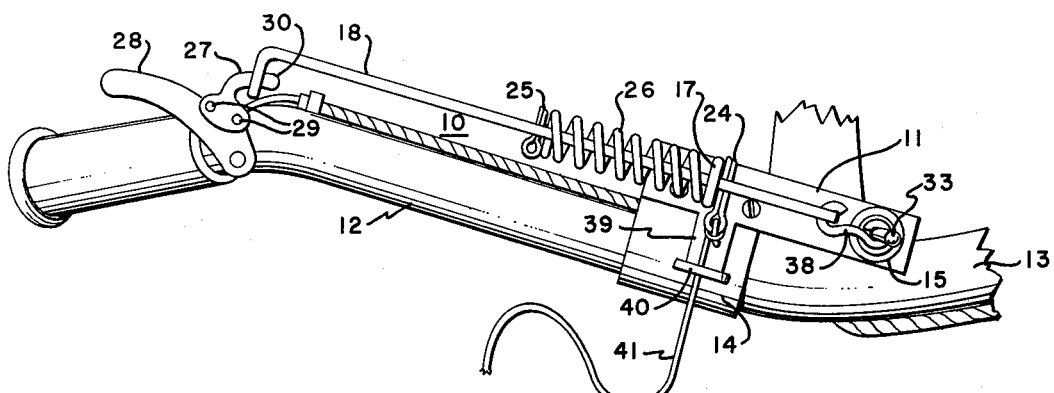
FIG. 2 is a top plan view of a typical handle bar with the safety control operatively associated with the hand brake lever carried by the handle bar, and shown with the safety control in the inactive position.

Referring now to the drawings and more particularly to the FIGS. 1 and 2, the safety control of this invention is shown to advantage and generally identified by the numeral 10. The safety control 10 includes a mounting plate 11 which is secured to the end portion 12 of the left handle bar, with respect to facing the direction of travel of the vehicle upon which the handle bars are mounted, assembly 13 by means of a mounting clamp 14. The plate 11 has a large diameter aperture 15 formed in one end thereof and a pair of smaller diameter bores 16 formed in and spaced along the other end thereof. In addition, an inverted U-shaped guide 17 is supported and projects upwardly from the upper surface of the mounting plate 11 between the bores 16.

An operating shaft 18 is slidingly received through the guide 17 and has an aperture 19 formed in one end. In addition, the opposite end of the shaft 18 includes a laterally directed end portion 20 apertured as at 21 and the intermediate portion of the shaft 18 includes a pair of transverse bores 22 and 23 spaced longitudinally therealong. An anchor pin in the form of a cotter pin 24 is frictionally passed through the bore 23 and abuts against the side of the guide 17 adjacent the aperture 15. A stop pin 25 is secured through the bore 22 and a compression spring 26 is disposed about the shaft 18 between the stop pin 25 and the guide 17, thereby yieldingly biasing the shaft 18 toward the left as viewed in FIGS. 2 through 4 of the drawings with the anchor or cotter pin 24 abutted against the guide 17.

A hook member 27 is secured to the lever type actuator 28 by means of suitable fasteners 29 and the free end 30 of the hook member 27 projects through the aperture or bore 21 formed in the laterally directed end portion 20 of the operator shaft 18. Also, the mounting neck portion 34 of a control switch 32 having a rockable actuator 33 is secured through the aperture 25 and the ignition wires 34 and 35 are electrically connected to the terminals 36 and 37 of the switch 32. Finally, a S-like hook member 38 is secured to the shaft 18 through the aperture 19 and encircles the actuator 33.

Figure 3:
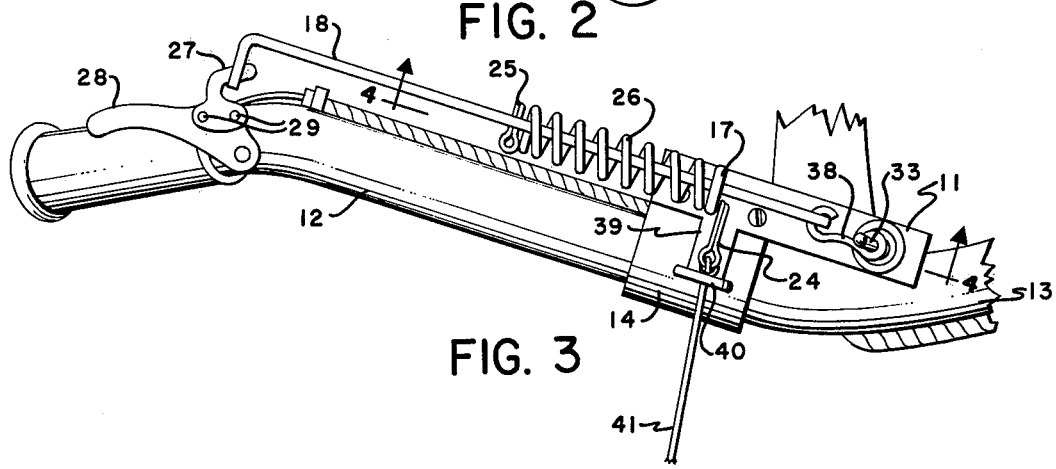
FIG. 3 is a top plan view of the apparatus of FIG. 2 shown with the present safety control in the active position.
Figure 4:
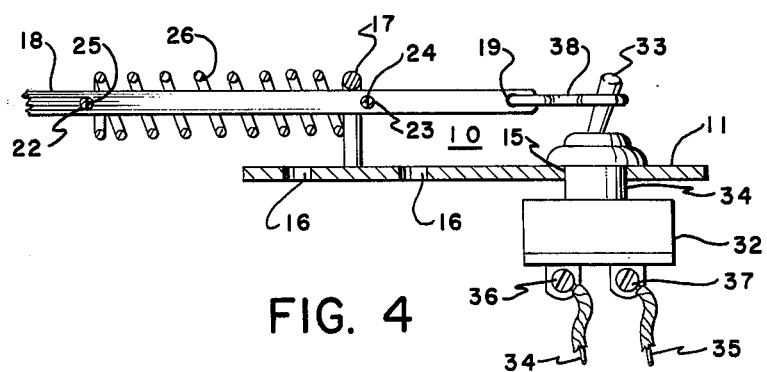
FIG. 4 is a fragmentary enlarged cross-sectional view taken substantially along the lines 4—4 of the FIG. 2, shown with the handle bar removed.

With attention now invited more specifically to FIGS. 2 and 3 of the drawings, it may be seen that the rockable actuator 33 is rocked to the right in FIG. 2 the drawings and that the actuator 28 is displaced in a clockwise direction in FIG. 2 relative to the position of the actuator 28 illustrated in FIG. 3. In these positions of the actuators 28 and 33, the brake assembly of the apparatus or vehicle (not shown) is inactive and the ignition circuit is active. Of course, it may also be seen from the FIG. 2 of the drawings that the anchor or cotter pin 24 is engaged with the guide 17 so as to limit movement of the shaft 18 to the left as viewed in FIG. 2.

Should the anchor or cotter pin 24 be withdrawn from the bore 23, the compression spring 26 quickly shifts the shaft 18 to the left from the position illustrated in FIG. 2 of the drawings to the position thereof illustrated in FIG. 3 of the drawings. This shifting of the shaft 18 causes the actuator 28 to be swung in a counterclockwise direction so as to apply the brakes of the vehicle (not shown) and the actuator 33 to be rocked to the left as viewed in the Figures of the drawings to disable the ignition circuit of the vehicle. Thus, withdrawing the pin 24 from the bore 23 causes the vehicle to be braked and the engine thereof to be rendered inoperative.

The mounting plate 11 provides means mounting the control 10 to the portion 12 and a housing for protection of the control 10, and includes a laterally directed arm 39 from which there is supported a guide ring 40 and a tether line 41 having one end thereof passed through the guide ring 40 and anchored to the pin 24. The end of the pin 24 provided with the tether line 41 may be attached to any of a number of release means which would actuate during emergency or loss of control in a riding vehicle such as a snowmobile (not shown). The other end of the tether member or line 41 is passed about the waist of the operator (not shown) of the vehicle. Thus, when the operator is thrown from the vehicle, the shaft 18 will be released for movement under the biasing action of the spring 26 toward the left as viewed in FIGS. 2 through 4 of the drawings in order to apply the brakes of the vehicle and to disable the ignition circuit of the engine of the vehicle.

The switch 32 may be serially connected in the ignition circuit and comprise a toggle-type on-off switch with the switch in the off position when the actuator 33 is swung to the left as viewed in FIG. 3 of the drawings. On the other hand, the switch 32 may be connected in parallel to the ignition circuit of the engine of the vehicle by means of the wire end 35 and to a suitable ground by means of the wire end 34. In this instance, the switch will be open when the actuator 33 is swung to the right as viewed in FIGS. 2 and 4 of the drawings and closed when the actuator 33 is swung to the left as viewed in FIG. 3.

Figure 5:
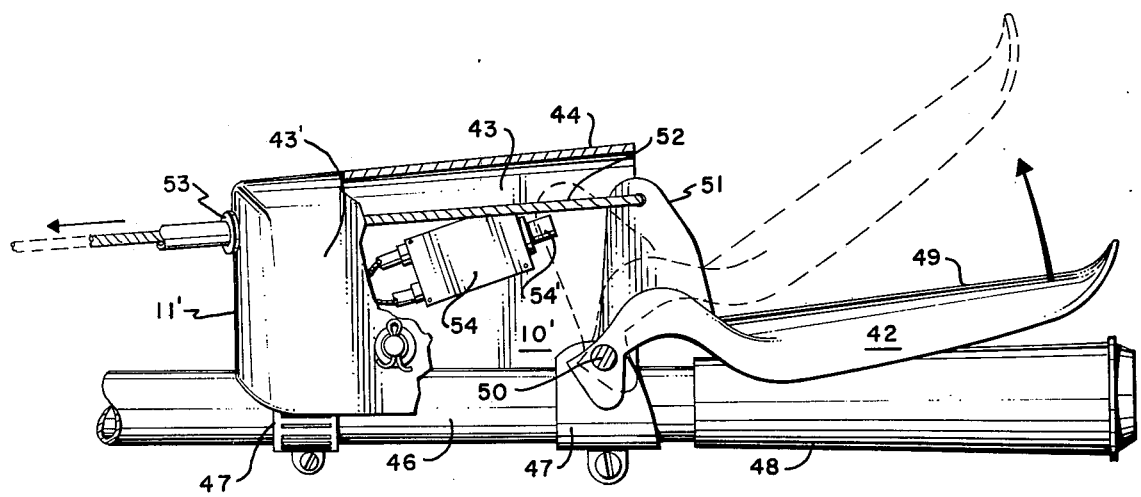
FIG. 5 is a left side view of the safety switch and brake actuator of this invention with a portion of the housing broken away and the brake and shut-down assembly shown in its various operating positions.

Referring now to the drawings and more particularly to the FIG. 5, the safety control of a further embodiment of this invention is shown to advantage and generally identified by the numeral 10'. The safety control hand 10' comprises a housing 11' and a brake and shut-down assembly 42. The housing 11' provides the principal protective enclosure, support and mounting means for the handle 10'. The housing 11' may be configured in any of a number of suitable shapes such as a substantially rectangular solid having a pair of upstanding rectangularly shaped sidewalls 43 and 43' having the longest dimensions disposed substantially horizontally, and a top wall 44 at the uppermost terminal edge of the walls 43 and 43'. It may be seen that the housing 11' may be fabricated of suitably bent sheet stock or high-impact plastic. The housing 11' is fastened distally from the terminal end of the handle bar 46 of a vehicle (not shown) by means of ring clamps 47 adjacent the grip 48.

The brake and shut-down assembly 42 of the safety control 10' of the further embodiment is also operable to simultaneously activate the brake system and stop operation of the vehicle engine (not shown). The brake and shut-down assembly 42 is provided with a handle lever 49 which permits operation of the vehicle when it is compressed substantially adjacent to the grip 48. The handle lever 49 may be fabricated of rolled sheet material with its open terminal edge disposed over the grip 48. It may be seen that the handle lever 49 disposed with its opening about the grip 48 is operable to substantially mate with the curvature of the grip 48 in a compact control structure. The terminal end of the lever 49 opposite the terminal end of the handle bars 46 is pivotally mounted to the housing 11' by means of a pin 50, with its central axis in alignment with the central axis of the grip 48. It may be seen that a spring urging means (not shown) may be provided to supply counterclockwise urging to the handle lever 49 with respect to the grip 48. A clevis 51 is fastened upstandingly from the uppermost terminal side of the handle lever 49 distally from its end opposite the terminal end of the handle bar 46. A brake control cable 52 is fastened distally from the uppermost terminal end of the clevis 51. The brake control cable 52 is carried into the housing 11' by a guide 53 disposed in the uppermost portion of the forward wall of the housing 11' with its central axis in alignment with the central axis of the handle bar 46. The brake control cable 52 is fastened in parallel with the conventional brake pedal or brake handle connection (not shown) to the brake mechanism (not shown).

The brake and shut-down assembly 42 includes also a cut off switch 54 which is connected in parallel alignment with the ignition circuit of the engine. The cut off switch 54 is suitably mounted in the housing 11' between the sidewalls 43 and 43'. The cut off switch 54 may be a reverse push button operable to maintain the circuit when the button 54' is extended, and to break the circuit and thus stop operation of the engine when the button is depressed. Mechanical means for depressing the button 54' may be a terminal edge adjacent the switch 54' of the clevis 51 of the handle lever 49. It is to be understood that the cut off switch 54' may be successfully employed alone in a shut-down assembly 42 in such apparatus as gas-powered tools and the like, in which release of the handle lever 49 would stop the operation of the engine.

Figure 6:
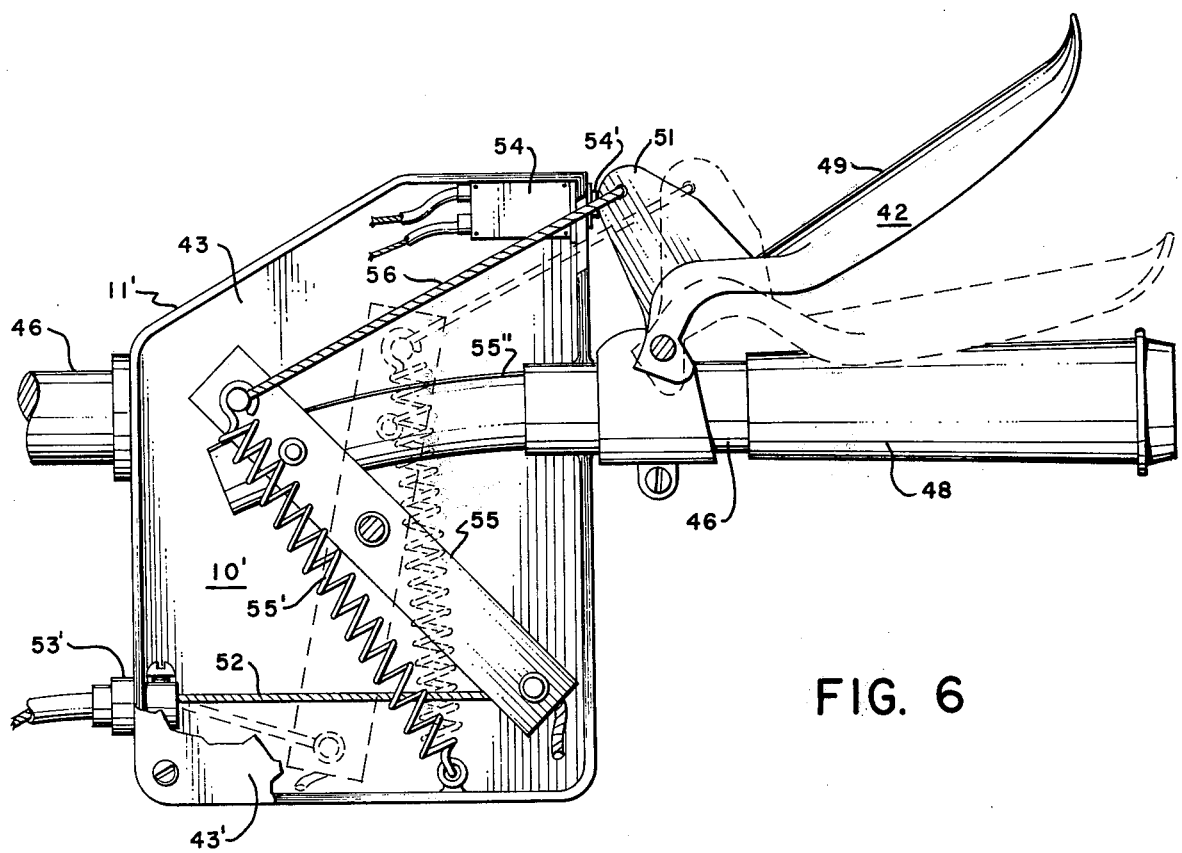
FIG. 6 is a cross-sectional view of a further embodiment of the brake and shut-down assembly of the present safety control, shown in its shut-down and brake positions in solid lines and its vehicle operating position in broken lines.

It may be seen that the brake lever 49, set out above, is operable to push the cable 52 as the lever 49 rotates away from the grip 48. It is obvious that some vehicles may include brake systems requiring the brake control cable 52 to be pulled by the handle lever 49. Referring to the FIG. 6, the brake and shut-down assembly 42 includes a brake lever 49, clevis 51, and cut off switch 54 substantially as set out above. The housing 11' may be fastened to the end of the handle bar 46, and may include a tubular grip 48. The assembly 42 further includes a half-rod 55 pivotally mounted at its center to the walls 43 and 43', and pivots from a diagonal line from the lower corner closest the grip 48 to the upper corner on the side opposite the grip 48 of the housing 11' to a vertical orientation. A linkage 56 may be pivotally mounted to the uppermost terminal end of the half-rod 55 at its forwardmost terminal end and at its rearwardmost terminal end to the uppermost terminal end of the clevis 51. The terminal end of the cable 52 is fastened to the lowermost terminal end of the half-rod 55, and accordingly is provided with its cable guide 53' distally from the lowermost terminal edge of the wall at the end opposite the grip 48 of the housing 11'. An urging spring 55' may be provided between the uppermost terminal end of the half-rod 55 and the lowermost wall distally from the end adjacent the grip 48 of the housing 11' to provide urging force to pull the cable 52 and to urge the handle lever 49 away from the grip 48 to engage the brake. Additional urging force may be provided by a spring loaded rod 55'' which is carried within the grip 48 and fastened to the half-rod 55 between the connection of the linkage web 56 and half-rod 55 and the central pivot of the half-rod 55. Leverage of the rod 55'' on the half-rod 55 may be increased by a slight curvature, as shown in the FIG. 6. Operation of the brake and shut-down assembly 42 of the further embodiment is substantially identical to that set out above.

Having thus described in detail a preferred apparatus which embodies the concepts and principles of the invention and which accomplishes the various objects, purposes and aims thereof, it is to be appreciated and will be apparent to those skilled in the art that many physical changes could be made in apparatus without altering the inventive concepts and principles embodied therein. Hence, it is intended that the scope of the invention be limited only to the extent indicated in the appended claims.

I claim:

1. A safety ignition switch and brake actuator for motorized apparatus, comprising a housing mounted to handle bars of said apparatus; and a shut-down assembly having a brake lever pivotally mounted over said handle bar adjacent the grip portion and being provided with means for actuating a cut-off switch having means to break the electrical circuit controlling ignition in the apparatus engine when said brake lever is released, said brake and ignition controls on said vehicle include portions thereof shiftable along generally the same path and in corresponding directions between active and inactive positions, said actuating means is a shaft-like member being supported from said vehicle for shifting movement generally along said path, means biasing said actuating means in the direction along said path in which said controls are shifted toward their active positions, a latch means being operatively engaged with said actuating means to retain the latter against movement along said path in the direction in which said controls are shifted to their active positions.

2. The combination of claim 1 including stationary abutment means relative to which said actuating means is shiftable, said latch means comprising a pin slidingly secured through a transverse bore in said actuating means and abutted against said abutment means.

3. The combination of claim 1 wherein said ignition circuit shutoff switch comprises an on-off switch connected in parallel to said ignition circuit and a suitable ground, said switch being closed when said actuating means is retracted by said brake lever.

4. The combination of claim 3 wherein said latch means includes an axially shiftable latch pin, a tether line secured to said pin in said actuating means, guide means spaced axially outwardly of one end of said pin on said housing through which said tether line extends, the end of said line on the side of said guide means remote from said latch pin being adapted for securement to an occupant of the vehicle.

5. The combination of claim 1 wherein said shut down assembly includes latch means having an axially shiftable latch pin in said actuator means, a tether line secured to said pin, guide means spaced axially outwardly of one end of said pin on said housing through which said tether line extends, the end of said line on the side of said guide means remote from said latch pin being adapted for securement to an occupant of the vehicle.

* * * * *